(12) United States Patent
Simeone et al.

(10) Patent No.: US 12,524,781 B2
(45) Date of Patent: Jan. 13, 2026

(54) METHODS AND SYSTEMS OF SELECTIVE MARKETING USING AGGREGATED CELEBRATORY DATES

(71) Applicants: William B Simeone, Milton, MA (US); Jacqueline B Simeone, Milton, MA (US); Regan C Simeone, Milton, MA (US); Gail M Simeone, Milton, MA (US); William M Simeone, Milton, MA (US)

(72) Inventors: William B Simeone, Milton, MA (US); Jacqueline B Simeone, Milton, MA (US); Regan C Simeone, Milton, MA (US); Gail M Simeone, Milton, MA (US); William M Simeone, Milton, MA (US)

( * ) Notice: Subject to any disclaimer, the term of this patent is extended or adjusted under 35 U.S.C. 154(b) by 0 days.

(21) Appl. No.: 16/356,726

(22) Filed: Mar. 18, 2019

(65) Prior Publication Data
US 2019/0287134 A1    Sep. 19, 2019

Related U.S. Application Data

(60) Provisional application No. 62/644,394, filed on Mar. 17, 2018.

(51) Int. Cl.
*G06Q 30/0251* (2023.01)

(52) U.S. Cl.
CPC ..... *G06Q 30/0252* (2013.01); *G06Q 30/0269* (2013.01)

(58) Field of Classification Search
CPC ................ G06Q 30/0252; G06Q 30/0269
USPC ............................................ 705/14.5
See application file for complete search history.

(56) References Cited

U.S. PATENT DOCUMENTS

| | | | |
|---|---|---|---|
| 7,702,542 B2* | 4/2010 | Aslanian, Jr. ...... | G06Q 30/0252 705/37 |
| 8,224,714 B2* | 7/2012 | Yost ....................... | G06Q 30/02 705/26.7 |
| 9,105,039 B2* | 8/2015 | Kramer ............... | G06Q 30/0225 |
| 9,256,761 B1* | 2/2016 | Sahu ................... | G06F 21/6218 |

OTHER PUBLICATIONS

Klein (2009).*
101 references (1974-2013).*
Grier(2005).*
Hayles(2005).*
Mindell(2015).*
Treffert(2010).*

* cited by examiner

*Primary Examiner* — Michael I Ezewoko
(74) *Attorney, Agent, or Firm* — JWIP & Patent Services, LLC; Jacob G. Weintraub, Esq.

(57) ABSTRACT

The present invention is directed to novel tools and systems that provide a method of selectively marketing to consumers, and which also address the expansion of the consumer base. In particular, the present invention provides methods of selective marketing to a consumer base by a provider using novel aggregated celebratory dates, as well as the tools and systems related thereto.

14 Claims, No Drawings

METHODS AND SYSTEMS OF SELECTIVE MARKETING USING AGGREGATED CELEBRATORY DATES

RELATED APPLICATIONS

This application claims priority to U.S. Provisional Patent Application No. 62/644,394, filed on Mar. 17, 2018; the entirety of which is incorporated herein by reference.

BACKGROUND OF THE INVENTION

Product and service marketing is a mainstay for the growth of most companies. However, the manner of this marketing can vary. In fact, marketing may range from the 'shot gun' approach of junk mail or spam electronic mail, to a variety of methods of database construction and selective/targeted marketing. Selective marketing has emerged as a relatively successful approach, especially in the current era, where electronically tracking purchases has become very easy. Such targeted marketing affords the provider of goods or services the ability to market more specifically to a consumer, based on known information about the consumer.

Prior known methods and systems for selective marketing rely heavily on purchase histories and database tracking to predict future consumer behavior, which typically fail to provide entry into new consumer bases. For this reason, marketing to reach new consumers is generally considered to be very difficult. In fact, it is well known that it is significantly easier to obtain new business from existing consumers; and may cost up to five times more to attract new consumers.

Clearly there is a need to develop new ways to afford inroads to all consumers, and to attract business in innovative ways. Unfortunately, the limits on targeted marketing to consumers also create limits to the scope of the reach of a product or service to a potential consumer base. As such, there is significant need for new tools and systems that provide a method of selectively marketing to consumers, and which address concerns related to expanding the consumer base.

SUMMARY OF THE INVENTION

Accordingly, the present invention is directed to novel tools and systems that provide a method of selectively marketing to consumers, and which also address the expansion of the consumer base. In particular, the present invention provides methods of selective marketing to a consumer base by a provider using novel aggregated celebratory dates, as well as the tools and systems related thereto.

As such, one aspect of the invention provides a method of selective marketing to a consumer base by a provider using an aggregated celebratory date (ACD) comprising the steps of collecting one or more individual celebratory dates for two or more consumers; aggregating said individual celebratory dates, and generating an aggregated celebratory date; and providing marketing materials selectively to at least one of the consumers to encourage celebration of the generated aggregated celebratory date. The method of selective marketing affords a provider the capability of selective marketing to one or more consumers of a consumer base using aggregated celebratory dates (ACD). In certain embodiments, the step of aggregating said individual celebratory dates comprises the step of calculating the cumulative date of said individual celebratory dates and generating a celebratory date that is a cumulative aggregated celebratory date, e.g. based on current year or based on pre-identified future momentous dates.

Another aspect of the invention provides a system for selective marketing to a consumer base by a provider using an aggregated celebratory date (ACD) comprising: a celebratory date aggregation unit comprising a machine-readable medium having instructions stored thereon for execution by a processor to perform a method. The method comprises the steps of: collecting one or more individual celebratory dates for two or more consumers; storing said individual celebratory dates of said consumers on a second machine-readable medium; and aggregating said individual celebratory dates, and generating an aggregated celebratory date. The system further comprises a unit for providing marketing materials selectively to at least one of the consumers to encourage celebration of the generated aggregated celebratory date, such that the system may be used by a provider for selective marketing to one or more consumers of a consumer base using aggregated celebratory dates (ACD). In certain embodiments, the step of aggregating said individual celebratory dates comprises the step of calculating the cumulative date of said individual celebratory dates and generating a celebratory date that is a cumulative aggregated celebratory date, e.g. based on current year or based on pre-identified future momentous dates.

DETAILED DESCRIPTION OF THE INVENTION

For providers, such as restaurants and retailers, holidays and special events offer a unique opportunity to connect with customers on a personal level by providing incentives to celebrate their special day with them. In this way, the present invention serves to offer groups of consumers the opportunity to celebrate a joint milestone, e.g., a birthday, on a single day. For example, a family may decide to observe their once-a-year family birthday with one large celebration rather than planning several smaller parties throughout the year. Alternatively, a couple might choose to celebrate their 100th or 120th birthday—a milestone birthday they might otherwise never have the opportunity to celebrate.

More particularly, the present invention provides methods and systems of attracting consumers of products and services using novel selective marketing that produce unique celebratory dates through aggregation techniques described herein, and which encourage celebration of the unique celebratory dates through use of the consumer products or services. Accordingly, the present invention is directed to novel tools and systems that provide a method of selectively marketing to consumers, and which also address the expansion of the consumer base. In particular, the present invention provides methods of selective marketing to a consumer base by a provider using novel aggregated celebratory dates, as well as the tools and systems related thereto.

The present invention, including systems, tools, and related methods will be described with reference to the following definitions that, for convenience, are set forth below. Unless otherwise specified, the below terms used herein are defined as follows:

I. Definitions

As used herein, the term "a," "an," "the" and similar terms used in the context of the present invention (especially in the context of the claims) are to be construed to cover both the singular and plural unless otherwise indicated herein or clearly contradicted by the context.

The term "consumer" is used herein to describe a customer, potential customer, or exogenous consumer of the goods or services of a provider. This term is distinct from the term "customer" which implies the pre-existence of a relationship between the consumer and the provider. Moreover, a "potential customer" is one that has provided information of proclivity (e.g., through publically available information) to a marketed product/service of a provider, but does not yet have a relationship with a specific provider. The total group of consumers is referred to herein as a "consumer base."

The term "couples" as used herein describes two people who are married, engaged, dating or otherwise closely associated romantically or sexually.

The term "exogenous" as used herein in the language "exogenous consumer" base" is used to describe those consumers that are not consumers that have shown a proclivity (e.g., through publically available information) to a marketed product/service of a provider.

The term "interface" is art-recognized, and is used herein to describe a shared boundary across which two separate components of a computer system exchange information, which can be between software, computer hardware, peripheral devices, humans and combinations of these. In specific embodiments, the term "interface" may be a user interface, e.g., a graphic user interface. Moreover, the operation of two separate components across the boundary, as in the interaction of the user with a user interface, is referred to herein as "interfacing." In certain embodiments, the interfacing may be bi-directional. In other embodiments, the interfacing may be uni-directional.

The language "machine-readable medium" is art-recognized, and describes a medium capable of storing data in a format readable by a mechanical device (rather than by a human). Examples of machine-readable media include magnetic media such as magnetic disks, cards, tapes, and drums, punched cards and paper tapes, optical disks, barcodes, magnetic ink characters, and solid state devices such as flash-based, SSD, etc. Machine-readable medium of the present invention are non-transitory, and therefore do not include signals per se, i.e., are directed only to hardware storage medium. Common machine-readable technologies include magnetic recording, processing waveforms, and barcodes. In particular embodiments, the machine-readable device is a solid state device. Optical character recognition (OCR) can be used to enable machines to read information available to humans. Any information retrievable by any form of energy can be machine-readable. Moreover, any data stored on a machine-readable medium may be transferred by streaming over a network. In a particular embodiment, the machine-readable medium is a network server disk, e.g., an internet server disk, e.g., a disk array. In specific embodiments, the machine-readable medium is more than one network server disk.

The term "marketing" is art-recognized, and is used herein to describe the action or business of advertising or promoting the selling of products or services, to match a company's products and services to the people who need or would want them.

The language "marketing materials" is used herein to describe advertisements, or offers for discounts.

The term "milestone" is used herein to describe an aggregated celebratory date marking a significant change in stage of life, e.g., a significant advancement in total years of life or of togetherness with one or more individuals. In certain embodiments, the milestone date is based on an equation that affords well accepted windows of time for significant changes, e.g., following equation: $50+n5$, wherein n is an integer greater than or equal to 0.

The term "momentous" is used herein to describe a milestone aggregated celebratory date of greater importance or significance, typically in reference to future dates.

The term "provider" is used herein to describe an entity or individual that offers of significance for sale a good and/or a service.

The term "storing" is art-recognized, and is used herein to describe the act of saving data on a machine readable medium in a manner that such data is subsequently retrievable on that machine readable medium.

The term "user" or "operator" are used interchangeably herein to describe any person that operates the systems of the present invention, e.g., interfaces with the user interface of the present invention.

II. Methods of Selective Marketing of the Invention

One embodiment of the invention provides a method of selective marketing to a consumer base by a provider using an aggregated celebratory date (ACD) comprising the steps of collecting one or more individual celebratory dates for two or more consumers, e.g., from one or more users;

aggregating said individual celebratory dates (e.g., by calculating an average date or cumulative date), and generating an aggregated celebratory date; and providing marketing materials selectively to at least one of the consumers to encourage celebration of the generated aggregated celebratory date, such that a provider is capable of selective marketing to one or more consumers of a consumer base using aggregated celebratory dates (ACD).

In certain embodiments of the methods of the present invention, the individual celebratory dates are for consumers selected from the group consisting of couples, families (e.g., nuclear family or extended family), groups of friends, classmates (e.g., entire classes, e.g., freshmen class), teammates, fraternity/sorority members, club members, groups of colleagues, and any combination thereof. In certain embodiments, the consumers are in a group of three or more, e.g., a group of 5 or more, e.g., a group of 10 or more, e.g., a group of 20 or more, e.g., a group of 50 or more, e.g., a group of 100 or more, e.g., a group of 1,000 or more, e.g., a group of 2,000 or more, e.g., a group of 5,000 or more, e.g., a group of 10,000 or more.

In certain embodiments of the methods of the present invention, the ACD is selected from the group consisting of a birthday, and an anniversary (e.g., wedding anniversary, friendship anniversary, social media friendship anniversary). In a particular embodiment, the ACD is an anniversary. In another particular embodiment, the ACD is a birthday. In certain embodiments, the aggregated celebratory date is a milestone date, e.g., which may depend on the number of consumers. In certain embodiments, the milestone date is based on the following equation: $50+n5$, wherein n is an integer greater than or equal to 0. For example, in specific embodiments, this milestone date is the date when the group consumers has a collective number of years of life totaling 50 years, 55 years, 60 years, 65 years, 70 years, 75 years, 80 years, 85 years, 90 years, or 95 years. In specific embodiments, this milestone date is the date when the group consumers has a collective number of years of life totaling 100 years. In specific embodiments, this milestone date is the date when the group consumers has a collective number of years of life totaling 500 years. In specific embodiments, this milestone date is the date when the group consumers has a collective number of years of life totaling 1,000 years. In specific embodiments, this milestone date is the date when the group consumers has a collective number of years of life totaling 5,000 years. In specific embodiments, this milestone date is the date when the group consumers has a collective number of years of life totaling 10,000 years.

In certain embodiments of the methods of the present invention, the marketing material is advertisement or a promotional offer (e.g., discount or package).

In certain embodiments of the methods of the present invention, the marketing materials are directed to products or services selected from the group consisting of a hotel, a resort, a casino, an automobile (e.g., for sale or for rent), a restaurant, a cruise, a flight, and any combination thereof.

In certain embodiments of the methods of the present invention, the marketing materials are directed to products or services based on the ACD, e.g., based on the extent of how significant is the ACD, e.g., based on the milestone. In particular embodiments, the more significant the ACD, e.g., a significant milestone date, the more extravagant the product or service.

In certain embodiments of the methods of the present invention, the consumer base is composed of customers.

In certain embodiments of the methods of the present invention, the consumer base is composed of potential customers.

In certain embodiments of the methods of the present invention, the consumer base is composed of an exogenous consumer base.

A. Collecting Celebratory Dates for One or More Consumers

In one step of the method, the step provides for collecting one or more individual celebratory dates for two or more consumers.

In certain embodiments of the methods of the present invention, the step of collecting further comprises interfacing with said consumers over an electronic interface (e.g., over the web or via a mobile app). Such interface may be used to generate revenue through advertising, e.g., ad banners.

In certain embodiments of the methods of the present invention, the step of collecting further comprises the steps of interfacing with a first consumer (e.g., an exogenous consumer) to collect one or more individual celebratory dates; and storing said individual celebratory dates of said first consumer on a machine-readable medium.

In certain embodiments of the methods of the present invention, the step of collecting further comprises the steps of interfacing with a second consumer to collect one or more individual celebratory dates; and storing said individual celebratory dates of said second consumer on a second machine-readable medium.

In certain embodiments, additional consumer information is collected, for example, including but not limited to name, address, email address, social media account information (e.g., Twitter®, Facebook®, Snapchat®, or Instagram®), family size/composition, and/or personal interests.

In certain embodiments, the consumer information is stored and controlled by the provider of goods and services. For example, the consumer information and related graphic user interface may be operated directly by a provider of goods or services, and provide the opportunity for the provider to provide marketing materials directly to the user or, more broadly, directly to the consumers.

In certain embodiments, the consumer information is stored and controlled by a separate service provider that provides the information to providers or potential providers, e.g., for a fee in exchange for services.

B. Aggregating Individual Celebratory Dates

In one step of the method, the step provides for aggregating said individual celebratory dates (e.g., by calculating an average date or cumulative date), and generating an aggregated celebratory date (ACD).

In certain embodiments of the methods of the present invention, the step of aggregating said individual celebratory dates comprises the step of calculating the cumulative date of said individual celebratory dates and generating a celebratory date that is a cumulative aggregated celebratory date. In certain embodiments, the cumulative aggregated celebratory date is based on current year. In certain embodiments, the cumulative aggregated celebratory date is based on pre-identified future momentous dates, e.g., well-known milestone dates.

In certain embodiments of the methods of the present invention, the step of aggregating said individual celebratory dates comprises the step of calculating the average annualized date of said individual celebratory dates and generating a celebratory date that is an average annualized aggregated celebratory date, e.g., the average birthday for the group of individuals.

In certain embodiments of the methods of the present invention, the ACD aggregation may be calculated in animal years (e.g., dog years), for example where the ultimate consumer may be or include an animal.

In certain embodiments of the methods of the present invention, the ACD aggregation may be further converted into animal years (e.g., dog years), for example where the ultimate consumer may be or include an animal.

C. Providing Marketing Materials Selectively to Encourage Celebration of the Generated Aggregated Celebratory Date In one step of the method, the step provides for providing marketing materials selectively to at least one of the consumers to encourage celebration of the generated aggregated celebratory date.

In certain embodiments of the methods of the present invention, the step of providing marketing materials comprises delivering said marketing materials electronically through, text messaging, email, social media platform, or direct access to the internet based marketing material (e.g., through webpage or mobile app based advertising or link presentation).

In certain embodiments of the methods of the present invention, the step of providing marketing materials comprises delivering reminders of upcoming milestone aggregated celebratory dates to at least one consumer.

III. System for Selective Marketing of the Invention

The methods of the present invention are useful as instructions stored on a machine-readable medium for execution by a processor to perform the method. In certain embodiments, the methods and tools of the present invention also make use and/or comprise a processor. Accordingly, any methods of the present invention, alone or in combination with other methods (such as those described herein or elsewhere) may be stored on a machine-readable medium for execution by a processor to perform the method. In certain embodiments, such a composition comprises a celebratory date aggregation unit of the invention and a unit for providing marketing materials selectively to said one or more consumers.

In this respect, another embodiment of the present invention provides a system for selective marketing to a consumer base by a provider using an aggregated celebratory date (ACD) comprising:

a celebratory date aggregation unit comprising a machine-readable medium having instructions stored thereon for execution by a processor to perform a method comprising the steps of:

collecting one or more individual celebratory dates for two or more consumers;

storing said individual celebratory dates of said consumers on a second machine-readable medium; and aggregating said individual celebratory dates (e.g., by calculating an average date or cumulative date), and generating an aggregated celebratory date (e.g., storing said aggregated celebratory dates on a third machine-readable medium); and a unit for providing marketing materials selectively to at least one of the consumers to encourage celebration of the generated aggregated celebratory date, such that the system may be used by a provider for selective marketing to one or more consumers of a consumer base using aggregated celebratory dates (ACD).

In certain embodiments of the system for selective marketing of the present invention, the machine-readable medium is online software. In a particular embodiment, the software is an online application. In particular embodiments, the software is a web-based application. In an alternative particular embodiment, the software is a cloud-based application. Moreover, the system comprises an interface that may be a web application accessible in an Internet browser, desktop software running on Windows, Mac OS, Linux (or any other operating system), or a mobile application (available on smart devices, e.g., smartphones, or tablets). In particular embodiments, the system interface is a cloud based interface, e.g., based on iOS or Android platforms.

In certain embodiments of the systems of the present invention, each of the machine-readable media is selected from the group consisting of magnetic media, punched cards, paper tapes, optical disks, barcodes, magnetic ink characters, and solid state devices, e.g., one or more network server disks. In particular embodiments, the machine-readable medium is one or more network server disks.

In certain embodiments, the systems of the present invention may be integrated with customer relationship management (CRM) systems, e.g., to generate rewards or incentives (e.g., automatically) for celebrating aggregated celebratory dates using providers goods or services.

In certain embodiments, the systems of the present invention may be integrated with a social media network, e.g., to automatically alert users or consumers when an aggregated celebratory date has arrived and to prompt friends and followers to celebrate with them.

A. Celebratory Date Aggregation Unit

One component of the systems of the present invention is a celebratory date aggregation unit comprising a machine-readable medium having instructions stored thereon for execution by a processor to perform a method. The method comprises the steps of: collecting one or more individual celebratory dates for two or more consumers; storing said individual celebratory dates of said consumers on a second machine-readable medium; and aggregating said individual celebratory dates (e.g., by calculating an average date or cumulative date), and generating an aggregated celebratory date. In certain embodiments, the method further comprises the step of storing said aggregated celebratory dates on a third machine-readable medium.

In certain embodiments of the systems of the present invention, the second machine-readable medium and the third machine-readable medium are the same machine-readable medium.

In certain embodiments of the systems of the present invention, the first machine-readable medium and the second machine-readable medium are the same machine-readable medium.

In certain embodiments of the systems of the present invention, the first machine-readable medium and the third machine-readable medium are the same machine-readable medium.

In certain embodiments of the systems of the present invention, the first machine-readable medium, second machine-readable medium and the third machine-readable medium are the same machine-readable medium.

In certain embodiments of the systems of the present invention, the individual celebratory dates are for consumers selected from the group consisting of couples, families (e.g., nuclear family or extended family), groups of friends, classmates (e.g., entire classes, e.g., freshmen class), teammates, fraternity/sorority members, club members, groups of colleagues, and any combination thereof. In certain embodiments, the consumers are in a group of three or more, e.g., a group of 5 or more, e.g., a group of 10 or more, e.g., a group of 20 or more, e.g., a group of 50 or more, e.g., a group of 100 or more, e.g., a group of 1,000 or more, e.g., a group of 2,000 or more, e.g., a group of 5,000 or more, e.g., a group of 10,000 or more.

In certain embodiments of the systems of the present invention, the ACD is selected from the group consisting of a birthday, and an anniversary (e.g., wedding anniversary, friendship anniversary, social media friendship anniversary). In a particular embodiment, the ACD is an anniversary. In another particular embodiment, the ACD is a birthday. In certain embodiments, the aggregated celebratory date is a milestone date, e.g., which may depend on the number of consumers. In certain embodiments, the milestone date is based on the following equation: $50+n5$, wherein n is an integer greater than or equal to 0. For example, in specific embodiments, this milestone date is the date when the group consumers has a collective number of years of life totaling 50 years, 55 years, 60 years, 65 years, 70 years, 75 years, 80 years, 85 years, 90 years, or 95 years. In specific embodiments, this milestone date is the date when the group consumers has a collective number of years of life totaling 100 years. In specific embodiments, this milestone date is the date when the group consumers has a collective number of years of life totaling 500 years. In specific embodiments, this milestone date is the date when the group consumers has a collective number of years of life totaling 1,000 years. In specific embodiments, this milestone date is the date when the group consumers has a collective number of years of life totaling 5,000 years. In specific embodiments, this milestone date is the date when the group consumers has a collective number of years of life totaling 10,000 years.

In certain embodiments of the systems of the present invention, the marketing material is advertisement or a promotional offer (e.g., discount or package).

In certain embodiments of the systems of the present invention, the marketing materials are directed to products or services selected from the group consisting of a hotel, a resort, a casino, an automobile (e.g., for sale or for rent), a restaurant, a cruise, a flight, and any combination thereof.

In certain embodiments of the systems of the present invention, the marketing materials are directed to products or services based on the ACD, e.g., based on the extent of how significant is the ACD, e.g., based on the milestone. In particular embodiments, the more significant the ACD, e.g., a significant milestone date, the more extravagant the product or service.

In certain embodiments of the systems of the present invention, the consumer base is composed of customers.

In certain embodiments of the systems of the present invention, the consumer base is composed of potential customers.

In certain embodiments of the systems of the present invention, the consumer base is composed of an exogenous consumer base.

In certain embodiments of the systems of the present invention, the step of collecting further comprises interfacing with said consumers over an electronic interface (e.g., over the web or via a mobile app). Such interface may be used to generate revenue through advertising, e.g., ad banners.

In certain embodiments of the systems of the present invention, the step of collecting further comprises the steps of interfacing with a first consumer (e.g., an exogenous consumer) to collect one or more individual celebratory dates; and storing said individual celebratory dates of said first consumer on a machine-readable medium.

In certain embodiments of the systems of the present invention, the step of collecting further comprises the steps of interfacing with a second consumer to collect one or more individual celebratory dates; and storing said individual celebratory dates of said second consumer on a second machine-readable medium.

In certain embodiments, additional consumer information is collected, for example, including but not limited to name, address, email address, social media account information (e.g., Twitter®, Facebook®, Snapchat®, or Instagram®), family size/composition, and/or personal interests.

In certain embodiments, the consumer information is stored and controlled by the provider of goods and services. For example, the consumer information and related graphic user interface may be operated directly by a provider of goods or services, and provide the opportunity for the provider to provide marketing materials directly to the user or, more broadly, directly to the consumers.

In certain embodiments, the consumer information is stored and controlled by a separate service provider that provides the information to providers or potential providers, e.g., for a fee in exchange for services.

In certain embodiments of the systems of the present invention, the step of aggregating said individual celebratory dates comprises the step of calculating the cumulative date of said individual celebratory dates and generating a celebratory date that is a cumulative aggregated celebratory date. In certain embodiments, the cumulative aggregated celebratory date is based on current year. In certain embodiments, the cumulative aggregated celebratory date is based on pre-identified future momentous dates, e.g., well-known milestone dates.

In certain embodiments of the systems of the present invention, the step of aggregating said individual celebratory dates comprises the step of calculating the average annualized date of said individual celebratory dates and generating a celebratory date that is an average annualized aggregated celebratory date, e.g., the average birthday for the group of individuals.

In certain embodiments of the systems of the present invention, the ACD aggregation may be calculated in animal years (e.g., dog years), for example where the ultimate consumer may be or include an animal.

In certain embodiments of the systems of the present invention, the ACD aggregation may be further converted into animal years (e.g., dog years), for example where the ultimate consumer may be or include an animal.

B. Unit for Providing Marketing Materials

Another component of the systems of the present invention is a unit for providing marketing materials selectively to said one or more consumers to encourage celebration of the generated aggregated celebratory date.

In certain embodiments of the systems of the present invention, the unit for providing marketing materials comprises a machine-readable medium having instructions stored thereon for execution by a processor to perform a method comprising the step of delivering said marketing materials.

In certain embodiments of the systems of the present invention, the step of delivering is performed electronically through, text messaging, email, social media platform, or direct access to the internet based marketing material (e.g., through webpage or mobile app based advertising or link presentation).

In certain embodiments of the systems of the present invention, the step of providing marketing materials comprises delivering reminders of upcoming milestone aggregated celebratory dates to at least one consumer.

In certain embodiments of the systems of the present invention, the marketing material is advertisement or a promotional offer (e.g., discount or package).

In certain embodiments of the systems of the present invention, the marketing materials are directed to products or services selected from the group consisting of a hotel, a resort, a casino, an automobile (e.g., for sale or for rent), a restaurant, a cruise, a flight, and any combination thereof.

In certain embodiments of the systems of the present invention, the marketing materials are directed to products or services based on the ACD, e.g., based on the extent of how significant is the ACD, e.g., based on the milestone.

EXEMPLIFICATION

Having thus described the invention in general terms, reference will now be made to the accompanying exemplary embodiments, which are not intended to be limiting in any way.

In this respect, it is to be understood that the invention is not limited in its application to the details of construction and to the arrangements of the components set forth in the description provided herein. The invention is capable of other embodiments and of being practiced and carried out in various ways. Also, it is to be understood that the phraseology and terminology employed herein are for the purpose of description and should not be regarded as limiting.

Example 1

Sample Graphic User Interface

One example of the graphic user interface provides the following features:
1. The user begins by entering two or more birthdates for two or more consumers into an application interface (e.g., mobile or computer application). This data collection and storage may also include data selected from name, anniversary (e.g., wedding anniversary, friendship anniversary, or social media friendship anniversary), and social/familial relationship (e.g., as defined from one central user).

2. The application then aggregates the birthdates by calculating the collective age of the consumers, and provides the user with this output.
3. The application also aggregates the date when the parties will reach another "birthday" (i.e., collective year of age), and provides this output to the user.
4. Further, the user is given the option, e.g., in a drop-down menu, to calculate the date on which the collective group will reach any collective age.

This interface may be operated directly by a provider of goods or services, and provide the opportunity for the provider to provide marketing materials directly to the user or, more broadly, directly to the consumers.

Alternatively, the interface may be operated by a separate service provider that collects and stores the information and provides the information to providers or potential providers, e.g., for a fee in exchange for services.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. A method of selective marketing in a customer relationship management system to a consumer base by a provider using an aggregated celebratory date (ACD) comprising the steps of
    collecting one or more individual celebratory dates in an application interface of the customer relationship management system for two or more consumers by interfacing with a first consumer to collect the one or more individual celebratory dates and storing said individual celebratory dates of said first consumer on a machine-readable medium, and by interfacing with at least one more consumer to collect the one or more individual celebratory dates and storing said individual celebratory dates of the at least one more consumer on the machine-readable medium;
    aggregating said individual celebratory dates in the application interface of the customer relationship management system for a group of selected consumers by calculating an average annualized date of said individual celebratory dates or by calculating a cumulative date of said individual celebratory dates, and generating an average annualized aggregated celebratory date or a cumulative aggregated celebratory date in the application interface for the selected consumers; and
    automatically providing marketing materials alerts from the customer relationship management system selectively to at least one of the selected consumers of the group to encourage celebration of the generated aggregated celebratory date, wherein the step of providing marketing materials for the generated aggregated celebratory date comprises delivering said marketing materials from the customer relationship management system electronically through, text messaging, email, social media platform, or direct access to the internet based marketing material,
    such that the customer relationship management system is capable of selective marketing to one or more consumers of a consumer base using the aggregated celebratory date (ACD).

2. The method of claim 1, wherein the step of aggregating said individual celebratory dates comprises the step of calculating the cumulative date of said individual celebratory dates and generating a celebratory date that is the cumulative aggregated celebratory date.

3. The method of claim 1, wherein the step of aggregating said individual celebratory dates comprises the step of calculating the average annualized date of said individual celebratory dates and generating a celebratory date that is the average annualized aggregated celebratory date.

4. The method of claim 1, wherein the individual celebratory dates are for consumers selected from the group consisting of couples, families, groups of friends, classmates, teammates, fraternity/sorority members, club members, groups of colleagues, and any combination thereof.

5. The method of claim 1, wherein the consumer base is an exogenous consumer base.

6. The method of claim 1, wherein the ACD is selected from the group consisting of a birthday, and an anniversary.

7. The method of claim 1, wherein the marketing materials are directed to products or services selected from the group consisting of a hotel, a resort, a casino, an automobile, a restaurant, a cruise, a flight, and any combination thereof.

8. A customer relationship management system for selective marketing to a consumer base by a provider using an aggregated celebratory date (ACD) comprising:
    a celebratory date aggregation unit comprising an application interface, wherein the application interface comprises a machine-readable medium having instructions stored thereon for execution by a processor to perform a method comprising the steps of:
    collecting one or more individual celebratory dates in the application interface for two or more consumers by interfacing with a first consumer to collect the one or more individual celebratory dates and storing said individual celebratory dates of said first consumer on a second machine-readable medium, and by interfacing with at least one more consumer to collect the one or more individual celebratory dates and storing said individual celebratory dates of the at least one more consumer on the second machine-readable medium; and
    aggregating said individual celebratory dates in the application interface for a group of selected consumers by calculating an average annualized date of said individual celebratory dates or by calculating a cumulative date of said individual celebratory dates, and generating an average annualized aggregated celebratory date or a cumulative aggregated celebratory date in the application interface for the selected consumers; and
    a unit for automatically providing marketing materials alerts from the customer relationship management system selectively to at least one of the consumers to encourage celebration of the generated aggregated celebratory date, wherein the unit for providing marketing materials for the generated aggregated celebratory date delivers said marketing materials from the customer relationship management system electronically through, text messaging, email, social media platform, or direct access to the internet based marketing material, such that the customer relationship management system may be used by a provider for selective marketing to one or more consumers of a consumer base using the aggregated celebratory date (ACD).

9. The system of claim 8, wherein the step of aggregating said individual celebratory dates comprises the step of calculating the cumulative date of said individual celebratory dates and generating a celebratory date that is the cumulative aggregated celebratory date.

10. The system of claim 8, wherein the step of aggregating said individual celebratory dates comprises the step of calculating the average annualized date of said individual celebratory dates and generating a celebratory date that is the average annualized aggregated celebratory date.

11. The system of claim 8, wherein the two or more individual celebratory dates are for consumers selected from the group consisting of couples, families, groups of friends, classmates, teammates, fraternity/sorority members, club members, groups of colleagues, and any combination thereof.

12. The system of claim 8, wherein the consumer base is an exogenous consumer base.

13. The system of claim 8, wherein the ACD is selected from the group consisting of a birthday, and an anniversary.

14. The system of claim 8, wherein the marketing materials are directed to products or services selected from the group consisting of a hotel, a resort, a casino, an automobile, a restaurant, a cruise, a flight, and any combination thereof.

* * * * *